2,765,851

PROCESS FOR IMPROVING OIL RECOVERY PROCESSES

Donald C. Bond, Crystal Lake, Ill., assignor to The Pure Oil Company, Chicago, Ill., a corporation of Ohio No Drawing. Application September 23, 1953, Serial No. 381,961

8 Claims. (Cl. 166—42)

This invention is directed to improving the efficiency of the recovery of hydrocarbon fluids from subterranean reservoirs. It is more specifically concerned with the use of surface active agents for increasing the ultimate recovery of crude petroleum oils.

In the production of crude petroleum oil, oil flow from the oil producing reservoirs is often impeded because of the low permeability of the formation. Although there are various methods, such as acidizing or hydraulic fracturing, available for actually breaking down the formation and increasing the permeability and porosity near the borehole, it is also possible to increase the effective permeability of the formation by modifying the interfacial tension between the reservoir surfaces and liquid phases in contact therewith. In effecting this objective, chemical substances known as surface active agents are available for altering the properties of the surface layer of one phase in contact with another. Because most of the applications of these materials have been to alleviate the problems which occur due to the presence of water in the fluid producing formation in the form of either formation water or water which has infiltrated into the formation during the course of drilling with water base muds, and in the recovery of oil by means of secondary recovery operations employing water, the purpose of the surface active agents has been to render the reservoir surfaces preferentially oil-wettable in order to overcome the inherent characteristics of the formation surfaces to be more readily wetted by water than oil. Preferential water wettability is objectionable because the water enters the more minute interstices of the formation thereby locking the flow of oil through these capillary channels. This capillary pressure can however be reduced and the effective permeability of the formation increased by the use of surface active materials which reduce not only the surface tension between the liquid phases but also change the tension between the liquid and solid phases thus effecting preferential wettability of the reservoir surfaces to either oil or water. In all instances, however, previous development work on the use of surface active agents in fluid recovery operations has involved the use of materials which reduce the interfacial tension between the liquid and the solid surfaces and preferentially nonionic materials which avoid the problems of incompatibility and destruction in activity through contact with briny formations. It has been found, however, that the ultimate recovery of crude oil from oil producing reservoirs may be enhanced by the use of surface active agents which decrease the wettability of the reservoir surfaces.

Therefore, it is the primary objective of this invention to provide a method for increasing the efficiency of fluid hydrocarbon recovery processes by making the surfaces of the oil bearing reservoirs hydrophobic and oleophobic. This and other objects of the instant invention will be made more apparent from the following discussion of the invention.

According to this invention it has been found that the introduction of fluorocarbons into a siliceous or calcareous geological formation will facilitate the recovery of fluid hydrocarbons therefrom. The selected fluorocarbon is introduced into the formation in the form of a solution and is adsorbed on the formation surfaces to form thereon an orientated, close-packed monolayer which renders the formation surfaces not only hydrophobic but also oleophobic thereby offering less resistance to the flow of the reservoir fluid with a resultant increase in production rate. Fluorocarbons are broadly defined as organic compounds in which a large percentage of hydrogen directly attached to the carbon atoms of the molecule has been replaced by fluorine. Suitable fluorocarbons which may be used in carrying out this invention include the perfluoro acids, e. g., perfluoro decanoic acid and its homologs as well as the perfluoro alcohols, such as trifluoroethanol and its higher homologs, the perfluoro amines, such as triperfluorobutylamine and its homologs, and the alkoxy hydrofluorocarbons, such as diperfluorobutyl ether and its homologs, and their mixtures. In addition, the common hydrolyzable acid derivatives, such as the anhydrides, acyl halides, esters, metal and ammonium salts, amides, nitriles and anilides formed from the perfluoro acid, will also function operatively, e. g., triperfluoro caprylic anhydride, triperfluorocaproyl chloride, methyl triperfluorocaprylate, potassium or ammonium triperfluorocaprylate, triperfluorocaprylamide, triperfluorocaprylonitrile, and triperfluorocaprylanilide.

In practicing the instant invention the fluorocarbon treating reagent is forced into the formation and permitted to remain therein for a time sufficient to effect the adsorption of the fluorocarbon on the reservoir surfaces. Although the selected fluorocarbon can be employed in undiluted form, the surfacing of the geological formation with the monolayer of the fluorocarbon treating agent employed is effected more economically by the use of dilute solutions of the fluorocarbon in a suitable solvent, such as normal decane, gasoline, carbon tetrachloride, benzene, etc. Preferentially the treating agent is introduced into the formation in the form of a very dilute solution, such as $10^{-3}$ to $10^{-4}$ moles per mole of solvent. However, stronger solutions may be employed. The usual concentrations of reagent employed in the solution are from about $10^{-3}$ to $10^{-4}$ mole fraction, although in certain instances more dilute or more concentrated solutions may be employed. To expedite the adsorption process it is desirable to pretreat the formation in order to bring about its dehydration. This may be done by any suitable mechanical heat transfer process whereby a gas is circulated through the formation or by means of a heating device placed within the borehole adjacent to the selected formation in order that heat may be applied thereto. As an alternative dehydrating method a water absorptive fluid, such as sulfuric acid, alcohol, or other dehydrating agents, may be employed. However, it is possible to treat the formation successfully without resorting to this expedient. The effectiveness of the invention is demonstrated by the following illustrative examples:

A piece of Berea sandstone 1½" x 2" x 12" was mounted in a suitable apparatus and saturated with distilled water. The saturated stone was weighed and the pore volume of the stone was calculated from the difference between the dry weights of the stone and the weight of the stone saturated with water. A paraffinic crude petroleum oil produced from the Cabin Creek, Virginia area was passed through the stone, displacing water, until no more water could be displaced from the stone. From the volume of displaced water and the pore volume, the oil content of the stone was then calculated. In this state the stone simulated a natural oil well core containing oil and connate water. Distilled water was then passed through the stone to simulate the water-flooding process. The oil displaced by the flooding water was collected and measured. Passage of water was continued until no more oil was forced from the stone. It was found that 39% of the oil was recovered in this manner.

A similar experiment was run on another piece of the same stone, adjacent to the sample used in the experiment described above. In this second experiment a 0.3% aqueous solution of perfluorocaprylic acid was used, instead of distilled water, as a flooding medium. In this case 52% of the oil was recovered, compared with 39% recovery in the case of distilled water. In other words, the use of a 0.3% aqueous solution of perfluorocaprylic acid as an injection fluid in the water flooding of an oil-saturated Berea sandstone core increased the efficiency of the operation by about 33%.

In another set of experiments a dry 1½" x 2" x 12" piece of Berea sandstone was saturated with Cabin Creek crude oil. Distilled water was passed through the stone until no more oil was produced. In this way 65% of the oil in the stone was recovered. A similar experiment was run in which a 0.3% aqueous perfluorocaprylic acid solution was used as a flooding medium. In this case 69% of the oil was recovered, compared with 65% recovery in the case of distilled water. Here again, on the basis of oil recovery it is seen that efficiency of the process was increased about 6% when flooding was effected with perfluorocaprylic acid solution as compared with flooding with water.

Experiments on capillary pressure demonstrated that perfluorocaprylic acid makes a stone less wettable by water. In this work Berea sandstone cylindrical plugs, 1" in diameter and 1" long, were used. Three plugs were saturated with distilled water, 0.3% aqeuous solution of perfluorocaprylic acid, and 0.3% aqueous solution of Darvan No. 1, a surface active agent which consists essentially of polymerized sodium salts of alkylnaphthalene sulfonic acids, commercially available from the Dewy and Almy Chemical Company. The plugs were mounted in an apparatus similar to that used by Bruce and Welge (Oil & Gas Journal, 46 (12) 223, July 26, 1947). Crude oil from the Bradford Third Sand was placed in contact with the plugs and 16 mm. mercury pressure was applied. After 96 hours the oil had displaced 17% of the water from the water-saturated plug, while 40% of the perfluorocaprylic acid solution had been displaced by oil, and only 8% of the Darvan No. 1 solution had been displaced by oil.

It is also to be noted that Schulman and Zisman (J. Colloid Science, pp. 465-68, October 1952) show that a film of perfluoroacid on a solid surface renders that surface non-wettable by water or hydrocarbons.

The amount of treating solution which is to be introduced into the formation, of course, will depend upon the characteristics of the formation which is to be treated. In general, however, between about 20 to 200 barrels will be required, although in some instances larger amounts may be necessary. Inasmuch as the adsorption of the fluorochemical by the formation surface is effected rather rapidly, it is only necessary for the treating solution to remain in contact therewith for a few second. However, in order to insure deep penetration and thorough treating, the solution is retained within the formation for a period of time up to about 24 hours.

It is to be noted that the instant invention may be used in the recovery of oil and gas from subterranean reservoirs and may be employed either to increase the efficiency of the primary recovery process or to increase the rate of recovery and total recovery of oil through the use of secondary recovery operations employing either water injection or gas injection techniques.

What is claimed is:

1. In a process for treating a siliceous, geological, oil producing formation to increase the effective permeability thereof, the step which comprises introducing into the formation a fluid solution of at least one perfluorocarbon compound selected from the group consisting of perfluoro organic acids and acid derivatives, perfluoro alcohols, perfluoro ethers, perfluoro amines, and perfluoro alkoxy compounds in an amount sufficient to coat the interstitial surfaces of said formation with an oriented, close-packed monolayer of said organic perfluorine compound.

2. A method in accordance with claim 1 in which the solution contains from about $10^{-3}$ to $10^{-4}$ mole of said perfluorocarbon compound per mole of solvent.

3. A method in accordance with claim 2 in which the solvent is selected from the group consisting of normal decane, gasoline, carbon tetrachloride, and benzene.

4. In the process for treating a siliceous, geological, oil producing formation to increase the effective permeability thereof, the steps which comprise initially dehydrating the interstitial surfaces of a fluid producing formation and thereafter introducing into the formation at least one perfluorocarbon compound selected from the group consisting of perfluoro organic acids and acid derivatives, perfluoro alcohols, perfluoro ethers, perfluoro amines, and perfluoro alkoxy compounds in an amount sufficient to coat the interstitial surfaces of said formation with an oriented, close-packed monolayer of said organic perfluorine compound.

5. A method in accordance with claim 4 in which the dehydrating of said formation is effected by contacting the formation with a fluid dehydrating reagent.

6. A method in accordance with claim 4 in which the dehydrating is effected by a mechanical heat transfer process whereby heat is applied to the formation by a suitable means to bring about its dehydration.

7. In the secondary recovery method wherein a partially depleted siliceous, geological, oil bearing reservoir rock is flooded with water to recover the residual oil therein, the improvement which comprises passing through said formation a dilute aqueous solution of at least one perfluorocarbon compound selected from the group consisting of perfluoro organic acids and acid derivatives, perfluoro alcohols, perfluoro ethers, perfluoro amines, and perfluoro alkoxy compounds, said compound being present in the solution in an amount sufficient to improve the recovery characteristics of the water solvent.

8. A method in accordance with claim 7 in which the perfluorocarbon compound is present in an amount from about $10^{-3}$ to $10^{-4}$ mole per mole of water.

References Cited in the file of this patent

UNITED STATES PATENTS

| | | |
|---|---|---|
| 2,225,434 | Harrigan | Dec. 17, 1940 |
| 2,246,725 | Garrison | June 24, 1941 |
| 2,267,548 | Berl | Dec. 23, 1941 |
| 2,633,919 | Bauer et al. | Apr. 7, 1953 |
| 2,676,985 | Husted | Apr. 27, 1954 |